US009823646B2

(12) United States Patent
Beaury et al.

(10) Patent No.: US 9,823,646 B2
(45) Date of Patent: Nov. 21, 2017

(54) DEVICE AND METHOD FOR GENERATING A TRIGGER SIGNAL IN A POSITION-MEASURING DEVICE AND CORRESPONDING POSITION-MEASURING DEVICE

(71) Applicant: DR. JOHANNES HEIDENHAIN GmbH, Traunreut (DE)

(72) Inventors: Bernhard Beaury, Uebersee (DE); Alexander Kobler, Burgkirchen (DE); Stephan Kreuzer, Surberg-Ettendorf (DE); Markus Mooshammer, Traunstein (DE); Michael Walter, Polling (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 359 days.

(21) Appl. No.: 14/738,969

(22) Filed: Jun. 15, 2015

(65) Prior Publication Data

US 2015/0378346 A1 Dec. 31, 2015

(30) Foreign Application Priority Data

Jun. 26, 2014 (DE) ........................ 10 2014 212 288

(51) Int. Cl.
*G05B 19/21* (2006.01)
*G05B 19/414* (2006.01)
(Continued)

(52) U.S. Cl.
CPC ........... *G05B 19/21* (2013.01); *G05B 19/414* (2013.01); *G05B 2219/25479* (2013.01);
(Continued)

(58) Field of Classification Search
CPC ..... H04L 7/044; H04L 25/4904; G01D 5/244; G01D 18/00; H03M 5/12;
(Continued)

(56) References Cited

U.S. PATENT DOCUMENTS

| | | | | | |
|---|---|---|---|---|---|
| 4,555,765 | A | * | 11/1985 | Crooke | G01R 13/345 315/367 |
| 5,087,835 | A | * | 2/1992 | Hattangadi | G06F 1/12 327/155 |
| 5,122,694 | A | * | 6/1992 | Bradford | G01R 13/32 326/94 |
| 5,687,103 | A | | 11/1997 | Hagl et al. | |
| 5,790,480 | A | * | 8/1998 | Klatser | G04F 10/10 368/121 |

(Continued)

FOREIGN PATENT DOCUMENTS

| | | | |
|---|---|---|---|
| DE | 102008027902 | A1 | 12/2009 |
| EP | 0660209 | A1 | 6/1995 |
| EP | 2570931 | A1 | 3/2013 |

*Primary Examiner* — Jaweed A Abbaszadeh
*Assistant Examiner* — Brian J Corcoran
(74) *Attorney, Agent, or Firm* — Leydig, Voit & Mayer, Ltd.

(57) ABSTRACT

A method generates an asynchronous trigger signal in a position-measuring device having a position-sensing unit, a processing unit and an interface unit. The position-measuring device is connectable via the interface unit and a bidirectional data channel to subsequent electronics for communication purposes. A synchronous data stream is generated from an asynchronous data stream arriving at the position-measuring device from a direction of the subsequent electronics by sampling the asynchronous data stream in a time pattern of a clock signal. A gate signal is generated upon an enable condition for outputting the trigger signal being detected by evaluating the synchronous data stream. The asynchronous trigger signal is generated upon the gate signal being present and a signal edge of the asynchronous data stream occurring.

8 Claims, 4 Drawing Sheets

(51) Int. Cl.
*H04L 7/04* (2006.01)
*H04L 5/14* (2006.01)

(52) U.S. Cl.
CPC .............. *G05B 2219/25483* (2013.01); *G05B 2219/33182* (2013.01); *G05B 2219/37333* (2013.01); *H04L 5/14* (2013.01); *H04L 7/04* (2013.01)

(58) Field of Classification Search
CPC ...... G05B 2219/33187; G05B 19/0423; G05B 19/21; G05B 19/414; G05B 2219/25479; G05B 2219/25483; G05B 2219/33182; G05B 2219/37333
See application file for complete search history.

(56) References Cited

U.S. PATENT DOCUMENTS

| | | | | |
|---|---|---|---|---|
| 6,879,201 | B1 * | 4/2005 | Chan | G06F 7/68 327/175 |
| 2004/0006443 | A1 * | 1/2004 | Huber-Lenk | G03F 7/70725 702/150 |
| 2004/0183517 | A1 * | 9/2004 | Reilly | G01R 31/3016 324/76.11 |
| 2005/0273294 | A1 * | 12/2005 | Hofbauer | G01D 5/244 702/150 |
| 2007/0290909 | A1 * | 12/2007 | Jungerman | G06F 5/00 341/144 |
| 2011/0116501 | A1 | 5/2011 | Beaury et al. | |
| 2013/0064321 | A1 | 3/2013 | Kopp | |
| 2014/0126677 | A1 * | 5/2014 | Fritsch | G01D 5/2448 375/362 |

* cited by examiner

DEVICE AND METHOD FOR GENERATING A TRIGGER SIGNAL IN A POSITION-MEASURING DEVICE AND CORRESPONDING POSITION-MEASURING DEVICE

CROSS-REFERENCE TO PRIOR APPLICATION

Priority is claimed to German Patent Application No. DE 10 2014 212 288.0, filed on Jun. 26, 2014, the entire disclosure of which is hereby incorporated by reference herein.

FIELD

The present invention relates to a method for generating a trigger signal in a position-measuring device, and a device for generating a trigger signal in such a position-measuring device.

BACKGROUND

In automation technology, position-measuring devices are used to determine, in closed-loop drive mechanisms, instantaneous position values which are needed by subsequent electronics, such as a numerical control system, to calculate setpoints for control circuits used to control the drive mechanism (e.g., the feed rate of a tool or workpiece). If the position-measuring devices are in the form of rotary encoders or angle-measuring devices, then these are directly or indirectly coupled, for example, to the shaft of a motor for this purpose. Length-measuring devices measure, for example, linear movements between a machine bed and a machine part that is positionable relative to the machine bed, such as, for example, a movable tool carriage.

Today, absolute position-measuring devices are preferably used. Such devices generate absolute measurement values, which are transmitted from the position-measuring device to the subsequent electronics via digital, mostly serial data interfaces. The measurement values are mostly position values (angular values or linear positions), but there are also known position-measuring devices which deliver velocity or acceleration values; i.e., measurement values which indicate changes in positions over time.

It is often necessary to be able to trigger events in the position-measuring device from the subsequent electronics via the serial data interface. This applies especially to measurement value requests.

For example, European Patent Application EP 0 660 209 A1 describes a position-measuring device having a synchronous serial interface; i.e., an interface where the time sequence of the data transmission on a (bidirectional) data line is controlled by a clock signal which is fed to the position-measuring device via a separate clock line. In this position-measuring device, the acquisition of the samples, which are subsequently processed into a position value, is triggered by the first edge of the clock signal. This first edge at the same time signals the beginning of a data transmission. Thus, the first edge of the clock signal serves as a trigger signal for the acquisition of the samples, and thus triggers the generation of a measurement value.

This approach cannot be used for serial interfaces that do not have a clock line. Moreover, in position-measuring devices having very fast signal-processing electronics, the measurement value (position values) may happen to be available at a time somewhat before it can be transmitted to the subsequent electronics in accordance with the rules of the interface protocol. Thus, from a control engineering point of view, this results in additional dead time (i.e., the measurement value is "outdated"). This means that when the measurement value arrives at the subsequent electronics, the drive mechanism has already moved further by a certain distance or through a certain angle. This problem can be minimized by mathematical algorithms (extrapolation), which function all the better, the more precisely the point in time of sample acquisition in the position-measuring device is known and the shorter the period of time is between the point in time of sample acquisition and the arrival of the measurement value at the subsequent electronics.

SUMMARY

In an embodiment, the present invention provides a method for generating an asynchronous trigger signal in a position-measuring device having a position-sensing unit, a processing unit and an interface unit. The position-measuring device is connectable via the interface unit and a bidirectional data channel to subsequent electronics for communication purposes. A synchronous data stream is generated from an asynchronous data stream arriving at the position-measuring device from a direction of the subsequent electronics by sampling the asynchronous data stream in a time pattern of a clock signal. A gate signal is generated upon an enable condition for outputting the trigger signal being detected by evaluating the synchronous data stream. The asynchronous trigger signal is generated upon the gate signal being present and a signal edge of the asynchronous data stream occurring.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides an improved method for generating an accurate trigger signal in a position-measuring device.

In an embodiment, the present invention provides a method for generating an asynchronous trigger signal in a position-measuring device having a position-sensing unit, a processing unit, and an interface unit, the position-measuring device being connectable via the interface unit and a bidirectional data channel to subsequent electronics for communication purposes, the method including the following steps:

- generating a synchronous data stream from an asynchronous data stream arriving at the position-measuring device from the direction of the subsequent electronics by sampling the asynchronous data stream in the time pattern of a clock signal;
- generating a gate signal when an enable condition for outputting the trigger signal is detected by evaluating the synchronous data stream; and
- generating the trigger signal when the gate signal is present and a signal edge of the asynchronous data stream occurs.

In another embodiment, the present invention provides an improved device for generating an accurate trigger signal in a position-measuring device.

In an embodiment, the present invention provides a device for generating an asynchronous trigger signal in a position-measuring device which has a position-sensing unit, a processing unit, and an interface unit, and is connectable via the interface unit and a bidirectional data channel to subsequent electronics for communication purposes. The device includes a trigger unit which receives an asynchronous data stream from the subsequent electronics and a synchronous data stream which is generatable in a synchronization unit by sampling the asynchronous data stream in the time pattern of a clock signal. The trigger unit has an evaluation unit in which an enable condition for outputting the trigger signal is detectable by evaluating the synchronous data stream and a gate signal is generatable, and further has a trigger signal output unit which receives the gate signal and in which the trigger signal is generatable when the gate signal is present and a signal edge of the asynchronous data stream occurs.

Figure 1:
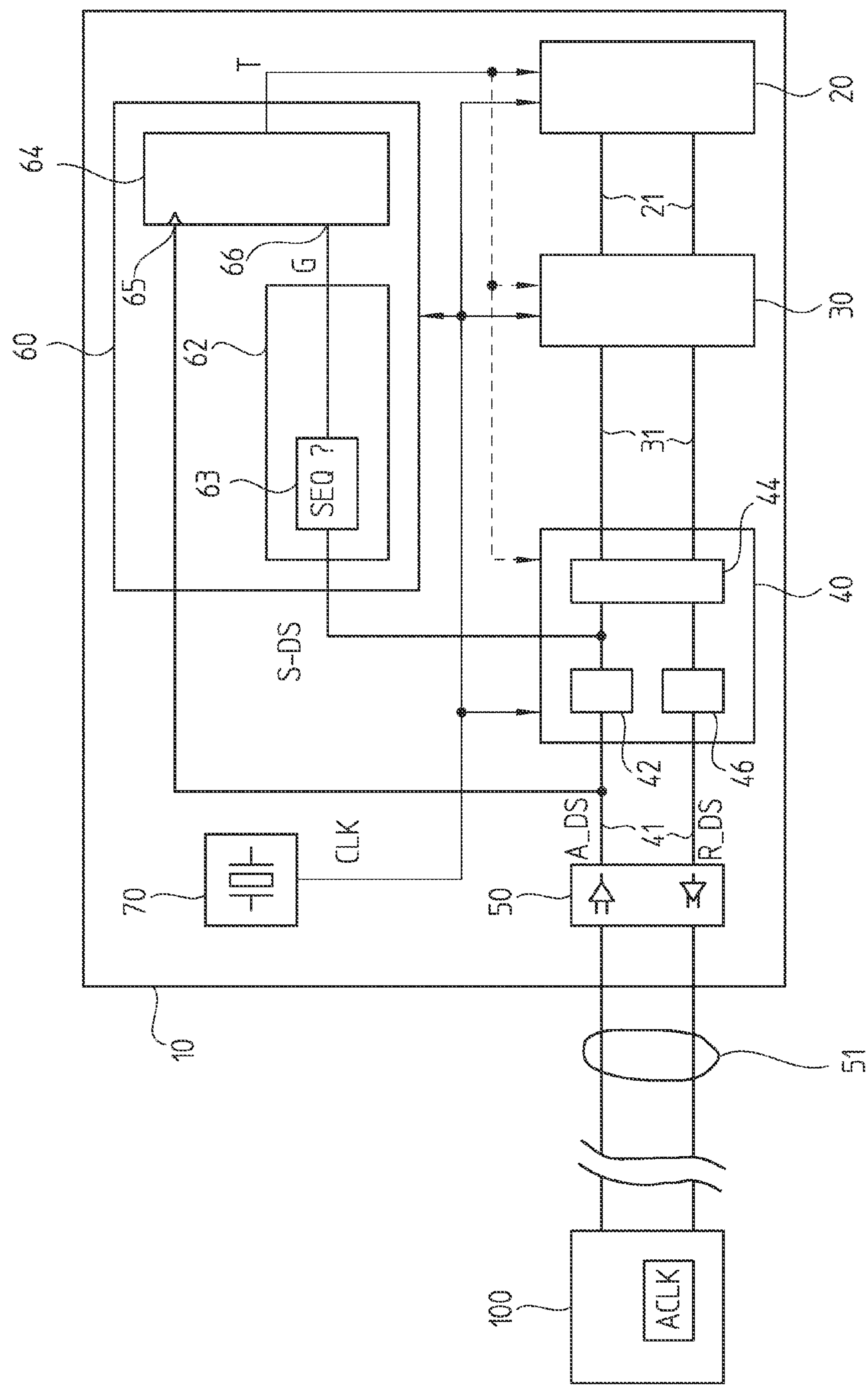
FIG. 1 is a block diagram of a position-measuring device according to the present invention.

FIG. 1 shows a block diagram of a position-measuring device 10 according to the present invention. Central functional units of position-measuring device 10 are a position-sensing unit 20 and a processing unit 30. Position-sensing unit 20 is suitably adapted to generate digital position values. For this purpose, it may, for example, include a measuring standard having a measuring graduation, a scanning unit for scanning the measuring graduation, as well as signal-processing electronics for generating the digital position value from the scanning signals of the scanning unit, which are generated by scanning the measuring graduation. The measuring standard and the scanning unit are arranged, in known manner, to be movable relative to each other, and are mechanically connected to machine parts whose relative position is to be measured. If position-measuring device 10 is a rotary encoder to measure the angular position of the shaft of an electric motor, then the scanning unit (or the housing of the rotary encoder) may be attached, for example, to a motor housing, and a shaft of the rotary encoder, which shaft is non-rotatably connected with the measuring standard, is connected to the motor shaft to be measured via a shaft coupling.

The physical scanning principle underlying position-sensing unit 20 is irrelevant to the present invention. It may, for example, be an optical, magnetic, capacitive or inductive scanning principle. Depending on the processing steps required to process the scanning signals of the scanning unit into position values, the signal-processing electronics includes functional units performing processing steps such as amplification, signal correction (offset correction, amplitude correction, phase correction), interpolation, counting grating periods, A/D conversion, etc.

Signals lines 21 are provided for transmission of control signals and/or data between position-sensing unit 20 and processing unit 30. Signals lines 21 serve in particular to transmit the position values generated in position-sensing unit 20 to processing unit 30.

In processing unit 30, the position values may be processed further, if necessary, to obtain output data. For this purpose, processing steps such as scaling, changing the data format, error correction, etc., may be required, which are performed purely digitally in processing unit 30. However, output data may not only be position values, but also velocity or acceleration values that are calculated in processing unit 30 from a plurality of successively generated position values.

In order for the processes in position-sensing unit 20 and processing unit 30 to be synchronized and performed in a precise time pattern, a clock generator 70 is provided in position-measuring device 10 to generate a clock signal CLK serving as a time base. Clock signal CLK is fed to position-sensing unit 20 and processing unit 30.

Furthermore, an interface unit 40 is provided in position-measuring device 10 to enable communication with subsequent electronics 100. In particular, the output data is transmitted via interface unit 40 to subsequent electronics 100. The output data is transmitted to interface unit 40, for example, via signal lines 31 from processing unit 30 or position-sensing unit 20. The physical connection between interface unit 40 and subsequent electronics 100 is here provided by at least one interface line 41 in position-measuring device 10 and an interface cable 51, between which a transmitter/receiver unit 50 is often provided, which converts signals to be transmitted, which are mostly present in the form of single-ended signals in position-measuring device 10, into differential signals according, for example, to the commonly used RS-485 standard, and generates single-ended signals from the differential signals received by position-measuring device 10 from subsequent electronics 100. Interface line 41, interface cable 51, and possibly transmitter/receiver unit 50, form a bidirectional data channel.

Alternatively, the data may also be transmitted optically between interface unit 40 and subsequent electronics 100. In such a variant, transmitter/receiver unit 50 would be implemented, for example, as a converter unit for converting electrical signals into optical signals (and vice versa), and interface cable 51 would be an optical waveguide.

Clock signal CLK is also fed to interface unit 40.

For the sake of completeness, it should be noted that power/voltage supply to position-measuring device 10 may also be accomplished via interface cable 51, and that position-measuring device 10 may be provided with a connector or connecting terminals for the connection of interface cable 51.

The manner in which communication is performed between subsequent electronics 100 and position-measuring device 10 is defined in an interface protocol. Often, a so-called request/response scheme is employed; i.e., subsequent electronics 100 (master) sends an instruction, possibly followed by data, to position-measuring device 10 (slave), which processes the instruction and may transmit requested data to subsequent electronics 100. Instructions may generally be write and/or read commands, for example, to write to or read from memory cells in processing unit 30. A special position request command may be provided for requesting a position value as an output datum to subsequent electronics 100.

Instructions and data are transmitted in the form of data frames structured according to the definitions of the data transmission protocol. The following is a list of several typical components of data frames:

Start sequence (Preamble)

The start sequence initiates the transmission of a data frame and serves to tell the respective receiving unit to expect instructions and/or data. The simplest form of a start sequence is a single bit (start bit). More complex start sequences may include, for example, alternating sequences of logic high and low levels and/or bit sequences by which the start sequence is uniquely identifiable.

Instruction

Instructions are usually transmitted only from the master (subsequent electronics 100) to the slave (position-measuring device 10) and indicate the type of access (e.g., read or write access). Instructions can have a defined length, such as 8 bits.

Receive Data

Receive data is data that is transmitted from the master (subsequent electronics 100) to the slave (position-measuring device 10). Receive data may include addresses which, in the case of a read command, indicate the memory address from which to read data, and in the case of a write command, indicate the memory address to which to write data.

Transmit Data

Transmit data is data that is requested by the master (subsequent electronics 100) by a command and which is transmitted from the slave (position-measuring device 10) to the master (subsequent electronics 100). Transmit data includes, in particular, the measurement values (e.g., position values) acquired in position-measuring device 10.

End Sequence (Postamble)

The end sequence terminates the transmission of the data frame. The end sequence may be a single bit (stop bit) or a defined bit sequence. The end sequence may also contain additional data, such as, for example, a checksum (CRC) which is calculated from the contents of the data frame and enables the respective receiving unit to detect bit errors in the data transmission.

In addition or as an alternative to the checksum in the end sequence, receive and/or transmit data may also contain checksums.

The physical transmission of data frames from subsequent electronics 100 to position-measuring device 10 occurs in the form of a data stream whose time behavior is determined by an interface clock signal ACLK of subsequent electronics 100. Interface clock signal ACLK defines the time pattern in which bits are transmitted from subsequent electronics 100 to interface unit 40 of position-measuring device 10 as the smallest to-be-transmitted information units of the data stream. In the opposite direction; i.e., from position-measuring device 10 to subsequent electronics 100, the time pattern of the data transmission may be derived, for example, from the clock signal CLK. The communication between position-measuring device 10 and subsequent electronics 100 may be performed by time-division multiplexing over a single bidirectional data channel. However, it is also possible that a unidirectional data channel may be provided for each data direction.

In the following description, processes in position-measuring device 10 which follow the time pattern of clock signal CLK will be referred to as "synchronous", while processes which are based on the time pattern of interface clock signal ACLK will be referred to as "asynchronous."

An asynchronous data stream A_DS received by position-measuring device 10 from subsequent electronics 100 is fed via interface line 41 to a synchronization unit 42 in interface unit 40. There, a synchronous data stream S_DS is generated from asynchronous data stream A_DS by sampling it in the time pattern of clock signal CLK. In other words, asynchronous data stream A_DS is converted into the time pattern of clock signal CLK. The information content of synchronous data stream S_DS remains the same as that of asynchronous data stream A_DS.

Synchronous data stream S_DS is fed to a communication unit 44, which is also disposed in interface unit 40. Communication unit 44 evaluates synchronous data stream S_DS; i.e., it extracts instructions, and possibly receive data, from the data frames arriving in synchronous data stream S_DS and passes them on to the respective unit(s) addressed (e.g., position-sensing unit 20, processing unit 30, etc.). Moreover, communication unit 44 receives transmit data, for example, from position-sensing unit 20 or processing unit 30, inserts it into data frames, and outputs it to an output unit 46 of interface unit 40. Finally, the output unit transmits the to-be-outputted data (for example, in the form of a serial response data stream R_DS) via transmitter/receiver unit 50 to subsequent electronics 100.

In order to generate a trigger signal T which is highly accurate from the perspective of subsequent electronics 100, a trigger unit 60 is provided here. Trigger signal T serves to initiate, in the encoder electronics of position-measuring device 10, events in the time pattern of interface clock signal ACLK and thus of subsequent electronics 100. The encoder electronics may have position-sensing unit 20, processing unit 30, or interface unit 40 associated therewith, for example. Depending on the event to be initiated, trigger signal T is fed to one or more units of the encoder electronics.

Trigger unit 60 receives both asynchronous data stream A_DS and synchronous data stream S_DS. In addition, trigger unit 60 may also receive clock signal CLK. In trigger unit 60, an evaluation unit 62 evaluates synchronous data stream S_DS such that when an enable condition for outputting trigger signal T is detected in synchronous data stream S_DS, a gate signal G will be generated. In this exemplary embodiment, the detection of a characteristic bit sequence SEQ in synchronous data stream S_DS serves as the enable condition. For this purpose, evaluation unit 62 includes a comparator unit 63 which compares the data arriving in synchronous data stream S_DS with the characteristic bit sequence SEQ searched for. If the comparison result is positive, evaluation unit 62 outputs gate signal G. Characteristic bit sequence SEQ may be contained, for example, in the start sequence (preamble) of the data frame received. Gate signal G and asynchronous data stream A_DS are fed to a trigger signal output unit 64, which outputs trigger signal T in response to the simultaneous presence of gate signal G and occurrence of a signal edge (a change in signal level) in the asynchronous data stream A_DS.

In a very simple embodiment, trigger signal output unit 64 may take the form of a logic AND gate.

Trigger signal output unit 64 may also be, for example, an edge-triggered flip-flop. In this case, trigger signal output unit 64 has a clock input 65 which receives asynchronous data stream A_DS, as well as an enable input 66 for gate signal G. The design of trigger signal output unit 64 is such that an active gate signal G enables clock input 65, and asynchronous trigger signal T is output in response to a signal edge of asynchronous data stream A_DS occurring at clock input 65 and gate signal G being simultaneously present. Depending on the design of clock input 65, either a rising or a falling signal edge or by both a rising and a falling signal edge may cause output of asynchronous trigger signal T.

After trigger signal T has been output, evaluation unit 62 and trigger signal output unit 64 may be reset.

It should be noted that the to-be-evaluated portion of trigger signal T is the turn-on edge (which indicates a change in signal level), and not the static signal level. Accordingly, units which receive trigger signal T and are intended to perform actions under the control of trigger signal T are advantageously controllable in an edge-triggered fashion.

Figure 2:
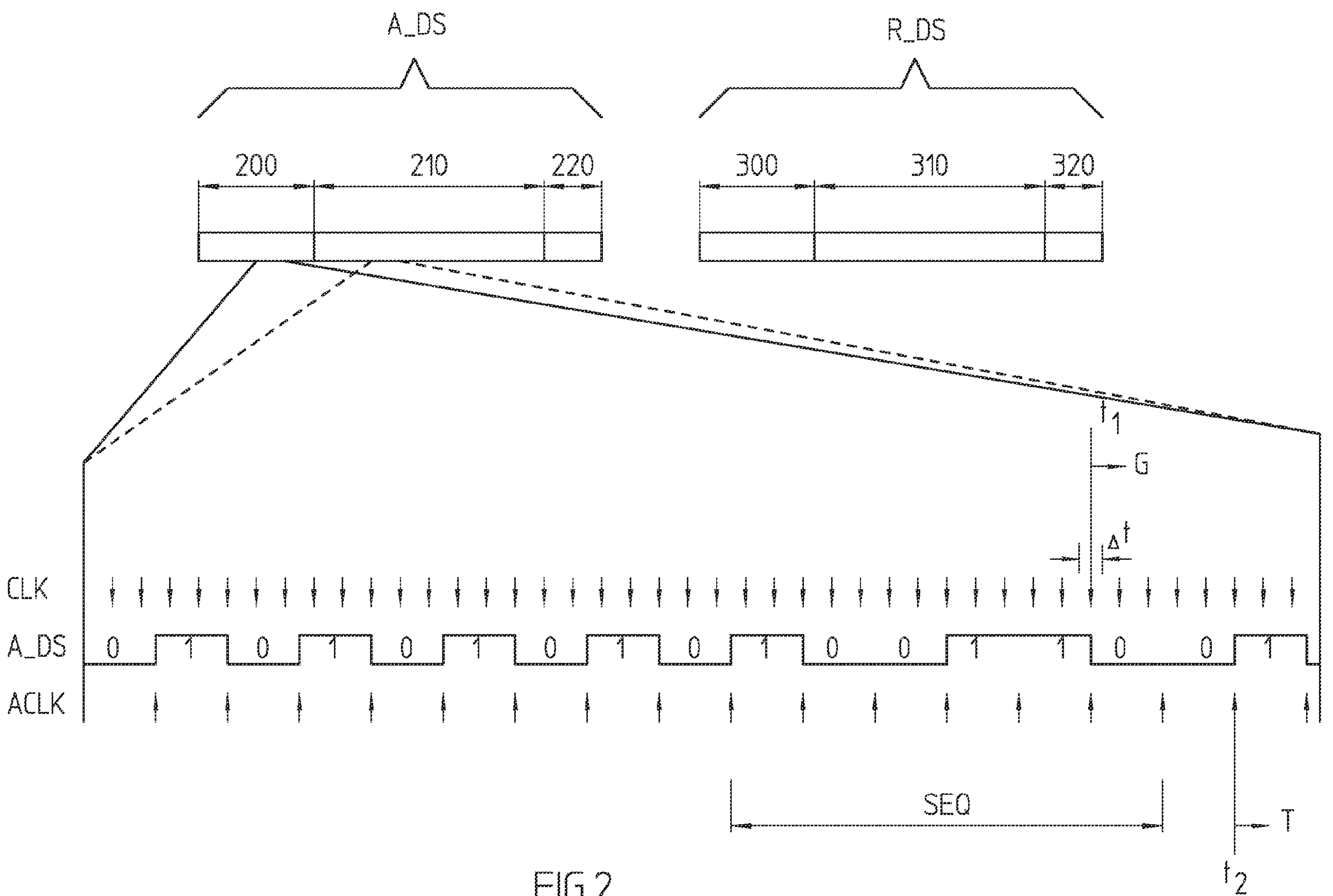
FIG. 2 is a simplified signal diagram for illustrating the operation of the position-measuring device according to FIG. 1.

FIG. 2 shows a simplified signal diagram to illustrate the inventive position-measuring device described with reference to FIG. 1.

The upper portion of FIG. 2 shows two data frames which symbolize a communication cycle between subsequent electronics 100 and position-measuring device 10. First, subsequent electronics 100 sends a data frame including a start sequence 200 (preamble), a command/data block 210 and an end sequence 220 (postamble) as an asynchronous data stream A_DS to position-measuring device 10. Command/data block 210 contains at least one command and may optionally also contain receive data. After position-measuring device 10 has processed the command, it transmits a data frame including a start sequence 300, a data block 310 (containing transmit data) and an end sequence 320 as a response data stream R_DS to subsequent electronics 100. Thus, for example, if a position value is requested, then command/data block 210 includes a position request command, and data block 310 includes a position value.

The lower portion of FIG. 2 shows a portion of asynchronous data stream A_DS, with reference to which the generation of trigger signal T will be described in detail. By way of example and not by way of limitation, the characteristic bit sequence SEQ to be identified is contained in start sequence 200. Generally suitable is any portion of the data packet that may contain uniquely identifiable bit sequences. For example, a second, alternative portion of asynchronous data stream A_DS that may include a characteristic bit sequence SEQ is indicated by the dashed lines, namely in the region of command/data block 210. This alternative is particularly advantageous when trigger signal T is to be generated as a function of a particular command transmitted by subsequent electronics 100 to position-measuring device 10. In this case, the entire or a portion of the bit sequence that characterizes the command may be selected as the characteristic bit sequence SEQ.

In principle, characteristic bit sequence SEQ may also be contained in end sequence 220 of the data packet. In this variant, it must be ensured that characteristic bit sequence SEQ cannot accidentally occur in command/data block 210.

The arrows below the shown portion of asynchronous data stream A_DS represent the points in time at which a bit change occurs. The time interval between each two arrows (the bit duration) corresponds to the period of interface clock signal ACLK.

The arrows above the shown portion of asynchronous data stream A_DS represent the sampling points in time at which the asynchronous data stream is sampled at time intervals corresponding to the period of clock signal CLK to obtain synchronous data stream S_DS. In order to achieve reliable sampling of asynchronous data stream A_DS, clock signal CLK has at least twice the frequency of interface clock signal ACLK. In this case, each bit of asynchronous data stream A_DS is sampled at least twice.

In practice, it is preferred to use even higher frequencies for sampling of asynchronous data stream A_DS, for example, four times the frequency of clock signal CLK.

Looking at point in time t1, it becomes clear why synchronous data stream S_DS is not suited for generating an accurate trigger signal T. Depending on the phase relationship of clock signals CLK, ACLK, the point in time at which asynchronous data stream A_DS is sampled may be shifted by up to one clock period of clock signal CLK. This results in a temporal uncertainty Δt for the detection of a bit change. Since clock signals CLK, ACLK are generated independently of each other, their phase relationship will change continuously in practice. As a result, a trigger signal generated based on synchronous data stream S_DS, which is produced with the aid of clock signal CLK, would also be shifted by this temporal uncertainty Δt with respect to the time pattern of interface clock signal ACLK (which constitutes also the time pattern of the control circuits in subsequent electronics 100). Such shifting may exhibit an oscillating or jerky behavior. Staying with the example where the acquisition of the samples that are processed into a position value is controlled by trigger signal T, it becomes obvious that any temporal uncertainty Δt of trigger signal T (and thus of the points in time at which measurement values are acquired) can very negatively affect the quality of the control circuits of subsequent electronics. This is especially true in the case of high feed rates and/or when high demands are placed on the position accuracy.

The characteristic bit sequence SEQ to be identified in this example is "100110". Assuming that in the illustrated case, the logic zero level at the end of characteristic bit sequence SEQ is already detected at point in time t1, evaluation unit 62 outputs gate signal G to event memory 64 after point in time t1. Thus, clock input 65 of event memory 64 is enabled, and the arrival of the next (in this case rising) signal edge (which indicates a bit change) of asynchronous data stream A_DS causes output of trigger signal T. In this manner, trigger signal T is output in the time pattern of interface clock signal ACLK, and thus becomes independent of the phase relationship of clock signals CLK, ACLK. Consequently, the repeatability of the generation of trigger signal T now depends only on the accuracy of interface clock signal ACLK.

Figure 3:
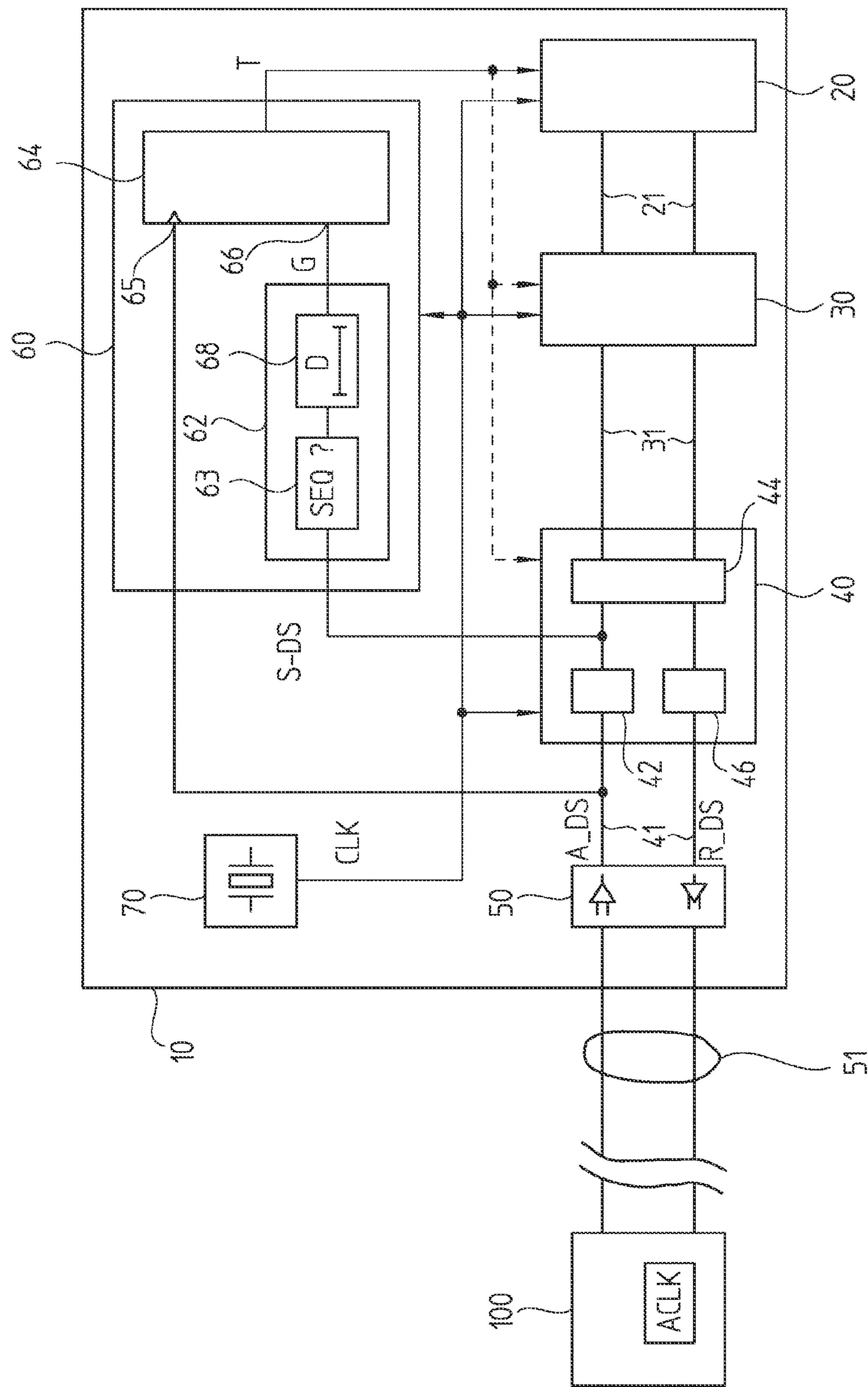
FIG. 3 is a block diagram of a further embodiment of a position-measuring device according to the present invention.

FIG. 3 shows a block diagram of a further embodiment of a position-measuring device according to the present invention. Components that have already been described with reference to FIG. 1 in connection with the first exemplary embodiment have been given the same reference numerals and will not be described in detail again.

In this exemplary embodiment, evaluation unit 62 additionally includes a delay unit 68 capable of delaying the output of gate signal G after detection of characteristic bit sequence SEQ in comparator unit 63 by the amount of a delay time D. This is particularly advantageous when trigger signal T is to be generated at a point in time which is not immediately preceded by a characteristic bit sequence SEQ. When receive data having undefined content is transmitted by subsequent electronics 100 to position-measuring device 10, another problem is that the receive data may accidentally contain a bit sequence that matches characteristic bit sequence SEQ searched for. Thus, if a trigger signal T is to be output after a data block having undefined content (e.g., during transmission of the end sequence), it is advantageous to detect a characteristic bit sequence SEQ that occurs before the data block, such as, for example, in start sequence 200, as illustrated below with reference to FIG. 4, and to suitably delay the output of gate signal G with the aid of delay time D.

Delay unit 68 may be in the form of a counter which outputs gate signal G only after a defined number of clock periods of clock signal CLK have elapsed (delay time D) after the occurrence of characteristic bit sequence SEQ. Thus, delay time D follows the time pattern of clock signal CLK. In this exemplary embodiment, the detection of characteristic bit sequence SEQ in synchronous data stream S_DS and the elapse of delay time D serve as the enable condition.

Figure 4:
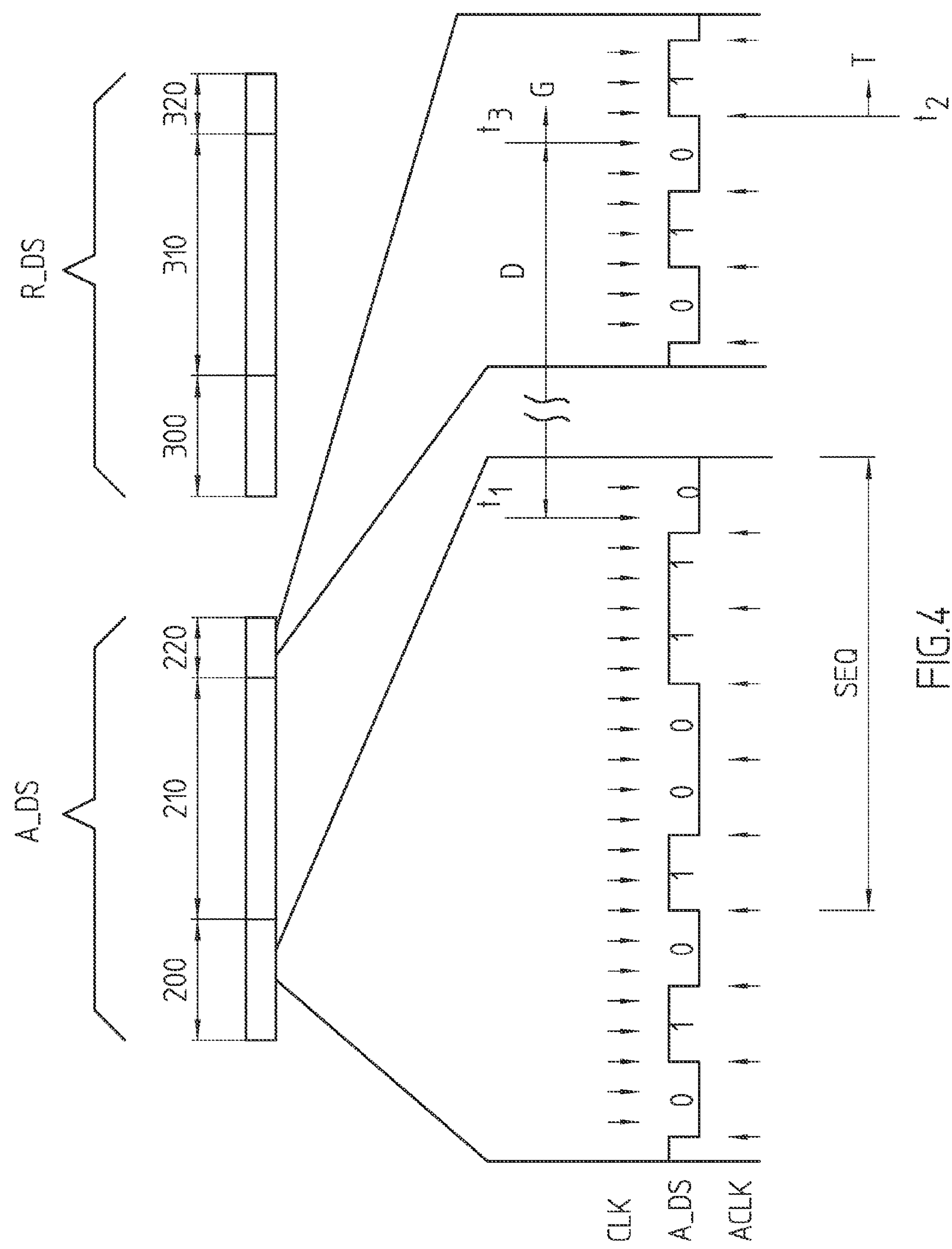
FIG. 4 is a simplified signal diagram for illustrating the operation of the position-measuring device according to FIG. 3.

FIG. 4 shows a simplified signal diagram to illustrate the operation of the inventive position-measuring device described with reference to FIG. 3.

Analogous to FIG. 2, the upper portion of FIG. 4 shows two data frames which symbolize a communication cycle between subsequent electronics 100 and position-measuring device 10. Also analogous to FIG. 2, the characteristic bit sequence SEQ to be identified is "100110". The lower portion of FIG. 4 shows a part of start sequence 200 as a portion of asynchronous data stream A_DS, which contains characteristic bit sequence SEQ. To the right thereof, a further portion of asynchronous data stream A_DS is shown, which contains a part of end sequence 220.

At point in time t1, characteristic bit sequence SEQ is uniquely identified. However, unlike the preceding example, evaluation unit 62 does not output gate signal G immediately, but only after a delay time D specified by delay unit 68. As mentioned earlier, delay time D is, in this example, determined by counting signal periods of clock signal CLK; i.e., in a synchronous manner, and therefore follows the time pattern of clock signal CLK. Delay time D is selected such that gate signal G is output to enable input 66 of trigger unit 60 (at point in time t3) in end sequence 220 of the data packet. The next signal edge (change in signal level) of asynchronous data stream A_DS at point in time t2 in turn causes output of trigger signal T.

In order to ensure that trigger signal T is always generated at the same position in the data frame (of asynchronous data stream A_DS), the signal edge causing the generation of trigger signal T at point in time t2 must also always occur at the same position in the data frame. In end sequence 220, signal edges of the stop bit or of a bit sequence characterizing end sequence 220 are particularly suited for generating trigger signal T.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for generating an asynchronous trigger signal in a position-measuring device having a position-sensing unit, a processing unit and an interface unit, the position-measuring device being connectable via the interface unit and a bidirectional data channel to subsequent electronics for communication purposes, the method comprising:

generating a synchronous data stream from an asynchronous data stream arriving at the position-measuring device from a direction of the subsequent electronics by sampling the asynchronous data stream in a time pattern of a clock signal;

generating a gate signal upon an enable condition for outputting the trigger signal being detected by evaluating the synchronous data stream; and generating the asynchronous trigger signal upon the gate signal being present and a signal edge of the asynchronous data stream occurring.

2. The method as recited in claim 1, wherein the detection of the enable condition includes detecting a characteristic bit sequence in the synchronous data stream, the enable condition being ascertained by comparing content of the synchronous data stream with the characteristic bit sequence.

3. The method as recited in claim 2, wherein the detection of the enable condition further includes delaying output of the gate signal after detection of the characteristic bit sequence by an amount of a delay time, the delay time following the time pattern of the clock signal.

4. The method as recited in claim 1, further comprising transmitting data frames in the asynchronous data stream, wherein a characteristic bit sequence is contained in a start sequence or in a command/data block of the data frames.

5. The method as recited in claim 4, wherein the asynchronous trigger signal is output in an end sequence of the data frames.

6. A device for generating an asynchronous trigger signal in a position-measuring device which has a position-sensing unit, a processing unit and an interface unit, and is connectable via the interface unit and a bidirectional data channel to subsequent electronics for communication purposes, the device comprising:

a trigger unit configured to receive an asynchronous data stream from the subsequent electronics and a synchronous data stream from a synchronization unit configured to generate the synchronous data stream by sampling the asynchronous data stream in a time pattern of a clock signal, the trigger unit comprising:

an evaluation unit configured to detect an enable condition for outputting the asynchronous trigger signal by evaluating the synchronous data stream and to generate a gate signal, and a trigger signal output unit configured to receive the gate signal and generate the asynchronous trigger signal upon the gate signal being present and a signal edge of the asynchronous data stream occurring.

7. The device as recited in claim 6, wherein the enable condition for outputting the asynchronous trigger signal includes an occurrence of a characteristic bit sequence in the synchronous data stream, and wherein the evaluation unit includes a comparator unit configured to compare content of the synchronous data stream with the characteristic bit sequence, the evaluation unit being configured to permit output the gate signal based on a positive comparison result.

8. The device as recited in claim 7, wherein the enable condition for outputting the asynchronous trigger signal further includes a delay of the output of the gate signal after detection of the characteristic bit sequence by a delay time, and wherein the evaluation unit further includes a delay unit configured to delay the output of the gate signal after the detection of the characteristic bit sequence by an amount of the delay time, the delay time following the time pattern of the clock signal.

* * * * *